United States Patent [19]

Gavrilovic

[11] 3,925,238
[45] Dec. 9, 1975

[54] NOVEL LIQUID CRYSTAL ELECTRO-OPTIC DEVICES

[75] Inventor: Dragan Milan Gavrilovic, Cranbury, N.J.

[73] Assignee: RCA Corporation, New York, N.Y.

[22] Filed: June 28, 1974

[21] Appl. No.: 484,086

[52] U.S. Cl. ...... 252/299; 252/408 LC; 260/465 D; 260/471 R; 350/160 LC
[51] Int. Cl.$^2$ ................ C09K 3/34; C07C 121/74; C07C 79/46
[58] Field of Search ............... 252/299, 408 LC; 350/160 LC; 260/465 D, 471 R

[56] References Cited

UNITED STATES PATENTS

| | | | |
|---|---|---|---|
| 3,795,436 | 3/1974 | Boller et al. | 252/408 LC |
| 3,796,479 | 3/1974 | Helfrich et al. | 252/408 LC |

FOREIGN PATENTS OR APPLICATIONS

| | | | |
|---|---|---|---|
| 2,306,739 | 8/1973 | Germany | 252/299 |
| 2,327,036 | 12/1973 | Germany | 252/299 |

OTHER PUBLICATIONS

Castellano, Joseph A., et al., J. Org. Chem., Vol. 33, pp. 3501–3504, (Sept. 1968).
Kast, Landolt–Dornstein, 6th Edition, Vol. II, Part 2a, Springer–Verlag, Berlin, pp. 266–335 (1960).
Gray, G. W. Molecular Structure and Properties of Liquid Crystals, 2nd Ed., Academic Press, Inc. London, pp. 125–138 (1969).
Gray, G. W., Liquid Crystals & Plastic Crystals, Vol. 1, Ellis Horwood, Ltd., London, pp. 103–152 (1974).

Primary Examiner—Benjamin R. Padgett
Assistant Examiner—T. S. Cron
Attorney, Agent, or Firm—G. H. Bruestle; B. E. Morris

[57] ABSTRACT

Nematic liquid crystal compounds of the formula:

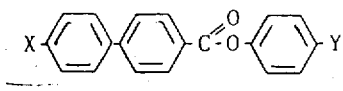

wherein X can be alkyl (R-), alkoxy (RO-), acyloxy

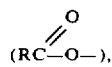

or alkylcarbonato

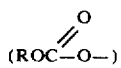

wherein R is an alkyl group of 1 to 10 carbon atoms and Y is a cyano or nitro group, have positive dielectric anisotropy and are useful in electrooptic cells which comprise a thin liquid crystal layer between two closely spaced parallel electrodes.

10 Claims, 1 Drawing Figure

U.S. Patent   Dec. 9, 1975   3,925,238
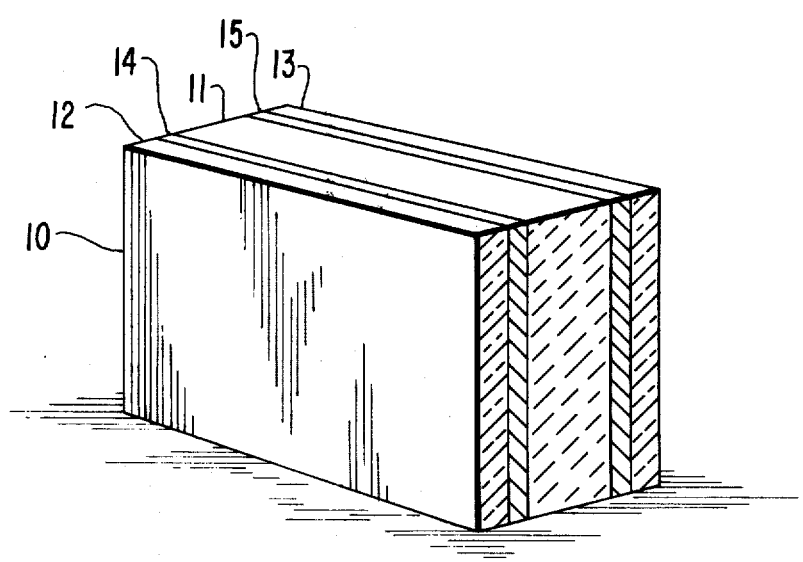

NOVEL LIQUID CRYSTAL ELECTRO-OPTIC DEVICES

This invention relates to novel liquid crystal compounds and to electro-optic devices including them. More particularly, this invention relates to nematic liquid crystal compounds having positive dielectric anisotropy and to field effect liquid crystal cells.

BACKGROUND OF THE INVENTION

Mesomorphic or liquid crystal compounds are of increasing interest in a variety of electro-optic display devices. Nematic liquid crystals are of particular interest for electrically controllable, flat panel displays such as watch faces, digital clocks, calculator displays, numeric displays for instruments and the like. Typically, a liquid crystal cell comprises a thin layer of a liquid crystal composition sandwiched between two closely spaced parallel conductive plates, at least one of which is transparent. When the conductive plates are connected to a source of current, an electric field is generated in the liquid crystal composition.

Nematic liquid crystal cells can operate in a dynamic scattering mode, as is described in U.S. Pat. No. 3,499,112 to Heilmeier and Zanoni, or in a field effect mode. Field effect devices contain nematic compounds or mixtures of compounds having positive dielectric anistropy, that is, the magnitude of the dielectric constant in a direction parallel to the long axis of the molecular chain is greater than the magnitude of the dielectric constant in a direction perpendicular to the long axis of the molecular chain, between conductive plates that have been treated so that the liquid crystal molecules align themselves in a particular direction, usually parallel, to the plane of the plates. When an electric field is applied, the positive dielectric anisotropy of the molecules causes the molecules to realign themselves in a direction parallel to the applied field and perpendicular to the plates. The change in alignment is made visible using a polarizer and an analyzer on either side of the cell. Field effect liquid crystal cells have the advantages of lower threshold voltages and wider viewing angle than dynamic scattering cells and have excellent contrast and long lifetimes.

Each mesomorphic compound has a particular temperature range in which it is an ordered liquid, ranging from the solid to nematic liquid crystal melting point up to the temperature at which it forms an isotropic liquid. This is the temperature range useful in electro-optic cells. Although, as is known, wide variations in use temperature can be effected by employing mixtures of liquid crystal compounds that are compatible with each other, no single liquid crystal compound or mixture of compounds can satisfy all use temperature ranges desired. Thus, new liquid crystal compounds which have different use temperature ranges are being sought to satisfy various temperature requirements for which the liquid crystal cells will be employed.

SUMMARY OF THE INVENTION

It has been discovered that certain nematic liquid crystal compounds derived from para-cyano- or para-nitrophenol and 4'-substituted-4-biphenylcarboxyl chloride which have positive dielectric anisotropy and have a very broad mesomorphic temperature range are useful in flat panel electro-optic devices.

BRIEF DESCRIPTION OF THE DRAWING

The FIGURE is a cross-sectional view of an electro-optic device embodying the invention.

DETAILED DESCRIPTION OF THE INVENTION

The novel liquid crystal compounds have the formula:

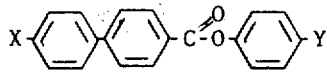

wherein X can be R-, RO-,

or

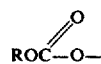

wherein R is an alkyl group of 1–10 carbon atoms and Y is a cyano or nitro group. Thus, X can be an alkyl group, an alkoxy group, an acyl group or an alkylcarbonato group respectively. Both branched and straight chain alkyl groups are meant to be included in the term alkyl group. These compounds are stable nematic compounds having high and very broad mesomorphic temperature ranges. They can be employed in electro-optic devices alone, in admixture with each other or in admixture with other liquid crystal compounds to broaden the use temperature range or vary the response of the cell.

The present compounds can be prepared by reacting p-cyano or p-nitrophenol with a 4'-substituted-4-biphenylcarboxyl chloride. The nematic liquid crystal compound can be purified by conventional means, as by recrystallization.

Referring to the FIGURE, a liquid crystal cell 10 comprises a layer of a liquid crystal composition 11 between a front transparent support plate 12 and a back support plate 13. The front support plate 12 is coated on the inside with a transparent conductive layer 14 to form an electrode. The back support plate 13 is also provided on the inside with a conductive layer 15 to form the other electrode. If light is to be transmitted through the cell, the back electrode 15 and the back support plate 13 are also transparent. If the liquid crystal cell is to reflect light, the back electrode 15 can be made reflective. As is known, additional compounds such as wetting agents, aligning agents and the like can be added to the liquid crystal composition to improve the optical or electrical performance of the cell. The electro-optic devices described above can be incorporated into various displays, such as electronic clocks, watches, advertising displays, numeric indicators and the like.

The invention will be further illustrated by the following examples but it is to be understood that the invention is not meant to be limited to the details described therein. In the examples, parts and percentages are by weight unless otherwise noted.

The transition temperatures of the compounds prepared in the examples were determined using a Thomas-Hoover melting point apparatus, a differential scanning calorimeter and a polarizing hot stage microscope in conventional manner.

Example 1 — Preparation of 4'-heptyl-4-biphenyl(p-cyanophenyl) carboxylate

Part A — Preparation of p-bromophenyl-p'-heptanophenone

Into a reaction vessel equipped with a magnetic stirrer, reflux condenser topped with a drying tube and a funnel were charged 25.2 parts of anhydrous aluminum trichloride and 48 parts by volume of carbon disulfide. The suspension was stirred while a solution of 35 parts of 4-bromobiphenyl, 23.8 parts of heptanoyl chloride and 48 parts by volume of carbon disulfide was added dropwise over a 30 minute period. The reaction mixture was stirred 30 minutes longer, then heated to reflux and refluxed for 2 hours. The reaction mixture was poured into 300 parts by volume of cold 12 percent hydrochloric acid, stirred for 30 minutes and extracted three times with 100 parts by volume portions of methylene chloride. The combined extracts were dried over anhydrous sodium sulfate, filtered and the solvent evaporated.

The resultant solid product was recrystallized from 200 parts by volume of acetone. An 87.8 percent yield (45.5 parts) of p-bromophenyl-p'-heptanophenone was obtained having a melting point of 98.5°–99.5°C.

Part B — Preparation of 4-bromo-4'-heptylbiphenyl

Into a reaction vessel equipped with a magnetic stirrer and a reflux condenser were charged the product as prepared in Part A, 46 parts of triethylsilane and 45.1 parts of trifluoroacetic acid. The reaction mixture was refluxed for 20 hours and poured into 200 parts by volume of 10 percent sodium hydroxide solution. The mixture was extracted 3 times with 100 parts by volume portions of methylene chloride, the combined extracts dried, filtered and the solvent evaporated.

The solid product was recrystallized from 200 parts by volume of hexane. An 87.2 percent yield (38 parts) of 4-bromo-4'-heptylbiphenyl was obtained having a melting point of 90°–92°C.

Part C — Preparation of 4'-heptyl-4-biphenyl carboxylic acid

Into a vessel as in Part A was charged 0.73 part of magnesium turnings and a solution of 6.6 parts of the product as prepared in Part B in 25 parts by volume of tetrahydrofuran was added dropwise while stirring. The reaction mixture was poured onto 20 parts of dry ice, stirred for 1 hour and 120 parts by volume of 6 percent hydrochloric acid was added slowly to precipitate the product.

The product was recrystallized from 300 parts by volume of benzene. A yield of 50.8 percent (3 parts) of 4'-heptyl-4-biphenylcarboxylic acid was obtained. This liquid crystal compound had a crystal to smectic transition temperature of 161°–162°C., a smectic to nematic transition temperature of 229°C. and a nematic to isotropic liquid transition temperature of 252°–254°C.

Part D — Preparation of 4'-heptyl-4-biphenyl(p-cyanophenyl)carboxylate.

Into a reaction vessel as in Part B was charged 2.65 parts of 4'-heptyl-4-biphenylcarboxylic chloride prepared from the product of Part C, 20 parts by volume of benzene, 1 part of p-cyanophenol and 2 parts by volume of pyridine. The reaction mixture was stirred and refluxed for 1 hour, filtered and the filtrate washed three times with 50 part portions of 3.6 percent hydrochloric acid and twice with 50 part portions of saturated sodium chloride solution. The washed filtrate was dried, filtered and the solvent evaporated.

The solid product was recrystallized from 50 parts by volume of ethylacetate and once from 200 parts by volume of hexane. A 31.4 percent yield (1 part) of 4'-heptyl-4-biphenyl(p-cyanophenyl)carboxylate was obtained. This compound has the structure

The structure was confirmed by elemental analysis: Calculated C, 81.58 percent; H 6.85 percent; N, 3.52 percent. Found: C, 81.37 percent; H, 6.68 percent; N, 3.54 percent.

This compound had a crystal to nematic transition temperature of 103°–104°C. and a nematic to isotropic transition temperature of 208°C.

Example 2 — Preparation of 4'-heptyloxy-4-biphenyl(p-cyanophenyl)carboxylate

The procedure of Example 1, Part D was followed except substituting 4'-heptyloxy-4-biphenylcarboxyl chloride for 4'-heptyl-4-biphenylcarboxyl chloride.

The product 4'-heptyloxy-4-biphenyl(p-cyanophenyl)carboxylate has the structure

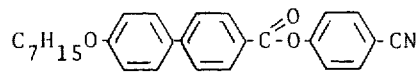

The structure was confirmed by elemental analysis: Calculated C, 78.42 percent; H, 6.58 percent; N, 3.39 percent. Found: C, 78.46 percent; H, 6.45 percent; N, 3.31 percent.

This compound had a crystal to nematic transition temperature of 113.5°–114°C. and a nematic to isotropic liquid transition temperature of 228°C.

Example 3 — Preparation of 4'-heptyloxy-4-biphenyl(p-nitrophenyl)carboxylate

The procedure of Example 2 was followed except substituting p-nitrophenol for p-cyanophenol.

The product, 4'-heptyloxy-4-biphenyl(p-nitrophenyl)carboxylate has the structure

This structure was confirmed by elemental analysis: Calculated C, 72.04 percent; H, 6.28 percent; N, 3.23 percent. Found C, 72.21 percent; H, 6.30 percent; N, 3.10 percent.

This compound had a crystal to smectic transition temperature of 93°C, smectic to nematic transition temperature of 187.5°C. and a nematic to isotropic liquid transition temperature of 214°C.

Example 4 — Preparation of 4'-hexanoyloxy-4-biphenyl(p-cyanophenyl)carboxylate

Part A — Preparation of 4'-hexanoyloxy-4-biphenylcarboxylic acid

Into a vessel as in Example 1 Part B, were charged 3.5 parts of 4'-hydroxy-4-biphenylcarboxylic acid, 7 parts of hexanoic anhydride, 25 parts by volume of benzene and 1 part of sulfuric acid. The reaction mixture was refluxed for 30 minutes, poured over 100 parts of ice, stirred and extracted with three 200 part by volume portions of methylene chloride. The combined extracts were dried over anhydrous sodium sulfate, filtered and the solvent evaporated. The product was recrystallized from acetone.

The product, 4'-hexanoyloxy-4-biphenylcarboxylic acid was a liquid crystal compound having a crystal to smectic transition temperature of 202°, a smectic to nematic transition temperature of 255°C. and a nematic to isotropic liquid transition temperature of 264°C.

Part B — Preparation of 4'-hexanoyloxy-4-biphenyl(p-cyanophenyl)carboxylate

The procedure of Example 1, Part D was followed except substituting 4'-hexanoyloxy-4-biphenylcarboxyl chloride for the 4'-heptyl-4-biphenylcarboxyl chloride.

The product, 4'-hexanoyloxy-4-biphenyl(p-cyanophenyl)carboxylate has the structure

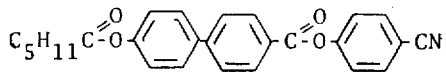

This compound had a crystal to nematic transition temperature of 138°–139°C and a nematic to isotropic liquid transition temperature of 249°C.

Example 5 — Preparation of 4'-hexanoyloxy-4-biphenyl(p-nitrophenyl)carboxylate

The procedure of Example 4, Part B was followed except substituting p-nitrophenol for the p-cyanophenol. The product, 4'-hexanoyloxy-4-biphenyl(p-nitrophenyl)carboxylate has the structure

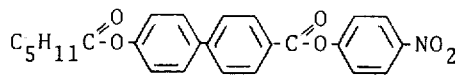

This compound has a crystal to nematic transition temperature of 93°–94°C. and a nematic to isotropic liquid transition temperature of 232°C.

Example 6 — Preparation of 4'-butylcarbonato-4-biphenyl(p-nitrophenyl)carboxylate The procedure of Example 1 Part D, was followed except substituting 4'-butylcarbonato-4-biphenylcarboxyl chloride for the 4'-heptyl-4-biphenylcarboxyl chloride and substituting p-nitrophenol for p-cyanophenol.

The product, 4'-butylcarbonato-4-biphenyl(p-nitrophenyl)carboxylate has the structure

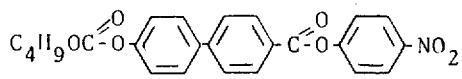

This compound had a crystal to smectic transition temperature of 98°C., a smectic to nematic transition temperature of 112°–114°C., and a nematic to isotropic liquid transition temperature of 222°C.

Example 7 — Preparation of 4'-(4-methyl)hexyloxy-4-biphenyl(p-cyanophenyl)carboxylate The procedure of Example 1 Part D, was followed except substituting 4'-(4-methyl)hexyloxy-4-biphenylcarboxyl chloride for 4'-heptyl-4-biphenylcarboxyl chloride.

The product, 4'-(4-methyl)hexyloxy-4-biphenyl(p-cyanophenyl)carboxylate has the structure

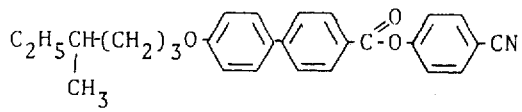

This compound had a crystal to nematic transition temperature of 93.5°–94.5°C. and a nematic to isotropic liquid transition temperature of 206.5°C.

I claim:

1. In an electro-optic cell comprising a liquid crystal layer between two electrodes, the improvement which comprises including in the liquid crystal layer a nematic liquid crystal compound of the formula:

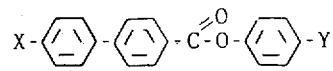

wherein X is a member selected from the group consisting of R-, RO-,

and

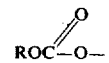

groups wherein R is an alkyl group of 1 to 10 carbon atoms and Y is a cyano or a nitro group.

2. A nematic liquid crystal compound having the formula:

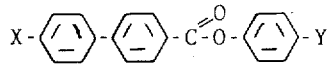

wherein X is a member selected from the group consisting of R-, RO-,

and

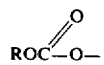

groups wherein R is an alkyl group of 1 to 10 carbon atoms and Y is a cyano or a nitro group.

3. A compound according to claim 2 wherein X is the R- group.

4. A compound according to claim 2 wherein X is the RO- group.

5. A compound according to claim 2 wherein X is the

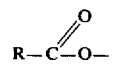

group.

6. A compound according to claim 2 wherein X is the

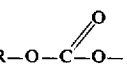

group.

7. A compound according to claim 2 wherein Y is a cyano group.

8. A compound according to claim 2 wherein Y is a nitro group.

9. A compound according to claim 2 wherein R is a straight chain alkyl group having 1 to 10 carbon atoms.

10. A compound according to claim 2 wherein R is a branched chain alkyl group having 1 to 10 carbon atoms.

* * * * *